(12) United States Patent
Guy et al.

(10) Patent No.: US 12,559,961 B2
(45) Date of Patent: Feb. 24, 2026

(54) FLOATING DISPENSER HOLDER

(71) Applicant: King Technology, Inc., Minnetonka, MN (US)

(72) Inventors: David Guy, Maple Grove, MN (US); Jeffrey D Johnson, Edina, MN (US); Darrin Swagel, Minnetonka, MN (US); Eric Barton, Eden, MN (US)

(73) Assignee: King Technology, Inc., Minnetonka, MN (US)

( * ) Notice: Subject to any disclaimer, the term of this patent is extended or adjusted under 35 U.S.C. 154(b) by 1090 days.

(21) Appl. No.: 17/300,650

(22) Filed: Sep. 9, 2021

(65) Prior Publication Data

US 2023/0070308 A1 Mar. 9, 2023

(51) Int. Cl.
*E04H 4/12* (2006.01)
*C02F 1/68* (2023.01)
*C02F 103/42* (2006.01)

(52) U.S. Cl.
CPC ........... *E04H 4/1281* (2013.01); *C02F 1/686* (2013.01); *C02F 2103/42* (2013.01); *C02F 2201/004* (2013.01); *C02F 2201/006* (2013.01)

(58) Field of Classification Search
CPC .................................................. E04H 4/1281
See application file for complete search history.

(56) References Cited

U.S. PATENT DOCUMENTS

| | | | | |
|---|---|---|---|---|
| 6,309,538 | B1 * | 10/2001 | Khan ................. | G01N 33/1886 |
| | | | | 210/85 |
| 2004/0168963 | A1 | 9/2004 | King et al. | |
| 2010/0059421 | A1 * | 3/2010 | Reed ....................... | C02F 1/688 |
| | | | | 210/86 |
| 2013/0092634 | A1 * | 4/2013 | King ....................... | C02F 1/766 |
| | | | | 210/749 |
| 2014/0110352 | A1 * | 4/2014 | King ....................... | C02F 1/505 |
| | | | | 222/173 |
| 2018/0213713 | A1 * | 8/2018 | Zito, Jr. ................. | A01C 7/004 |
| 2019/0022603 | A1 * | 1/2019 | Huang .................... | C02F 1/688 |

FOREIGN PATENT DOCUMENTS

| | | |
|---|---|---|
| EP | 2910302 A1 | 8/2015 |
| WO | 0024991 A1 | 5/2000 |
| WO | 2020185989 A1 | 9/2020 |

OTHER PUBLICATIONS

European Patent Office "Extended European Search Report" From Application No. 24157143.9, Dated Sep. 17, 2024, pp. 7.

* cited by examiner

*Primary Examiner* — Bradley R Spies
*Assistant Examiner* — Jeannie McDermott
(74) *Attorney, Agent, or Firm* — Fredrikson & Byron, P.A.

(57) ABSTRACT

A floating dispenser holder having a platform supporting a dispensing cartridge in a dispensing condition and a canopy extending over the dispensing cartridge located on the platform.

17 Claims, 5 Drawing Sheets

*FIG. 5*
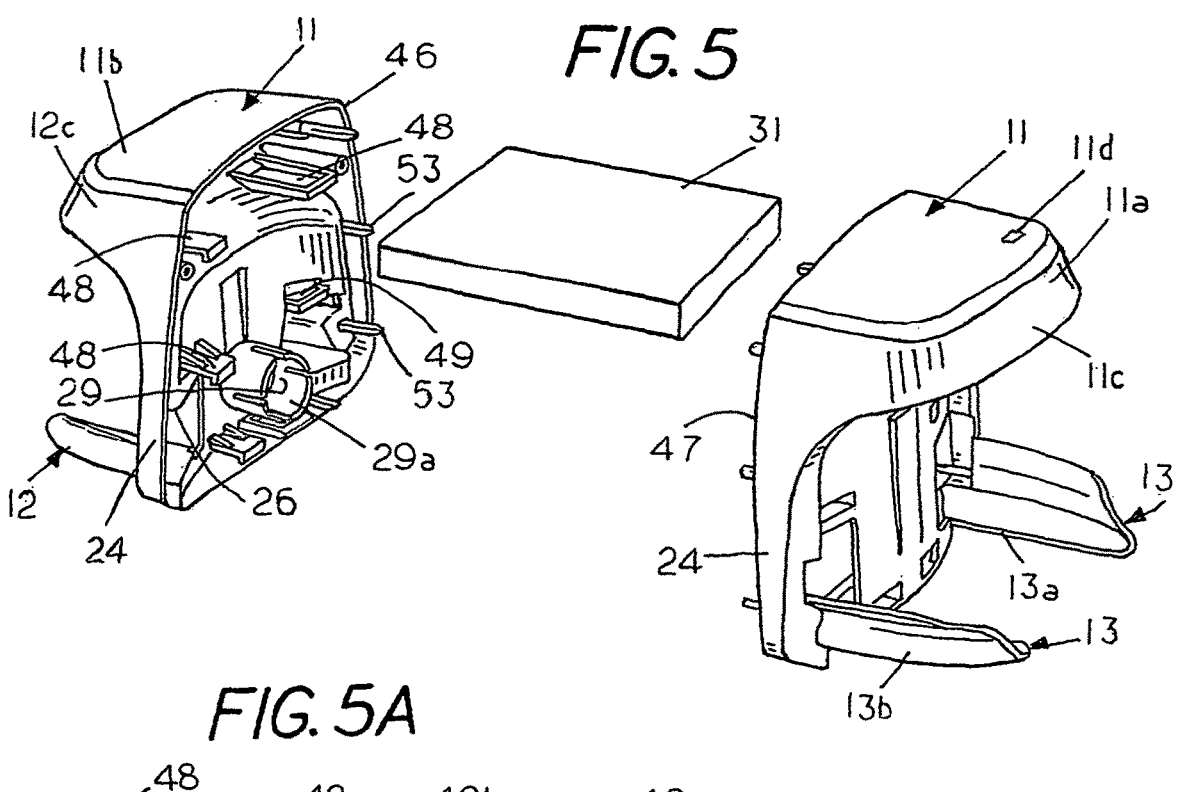
*FIG. 5A*
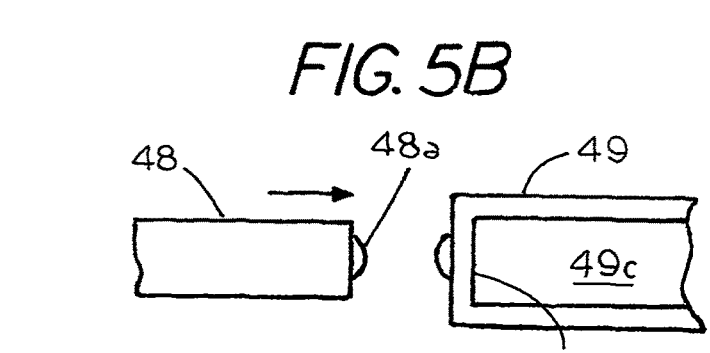
*FIG. 5B*
*FIG. 5C*
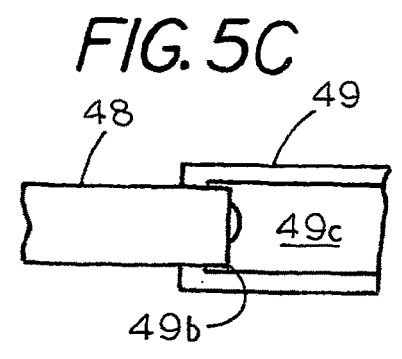

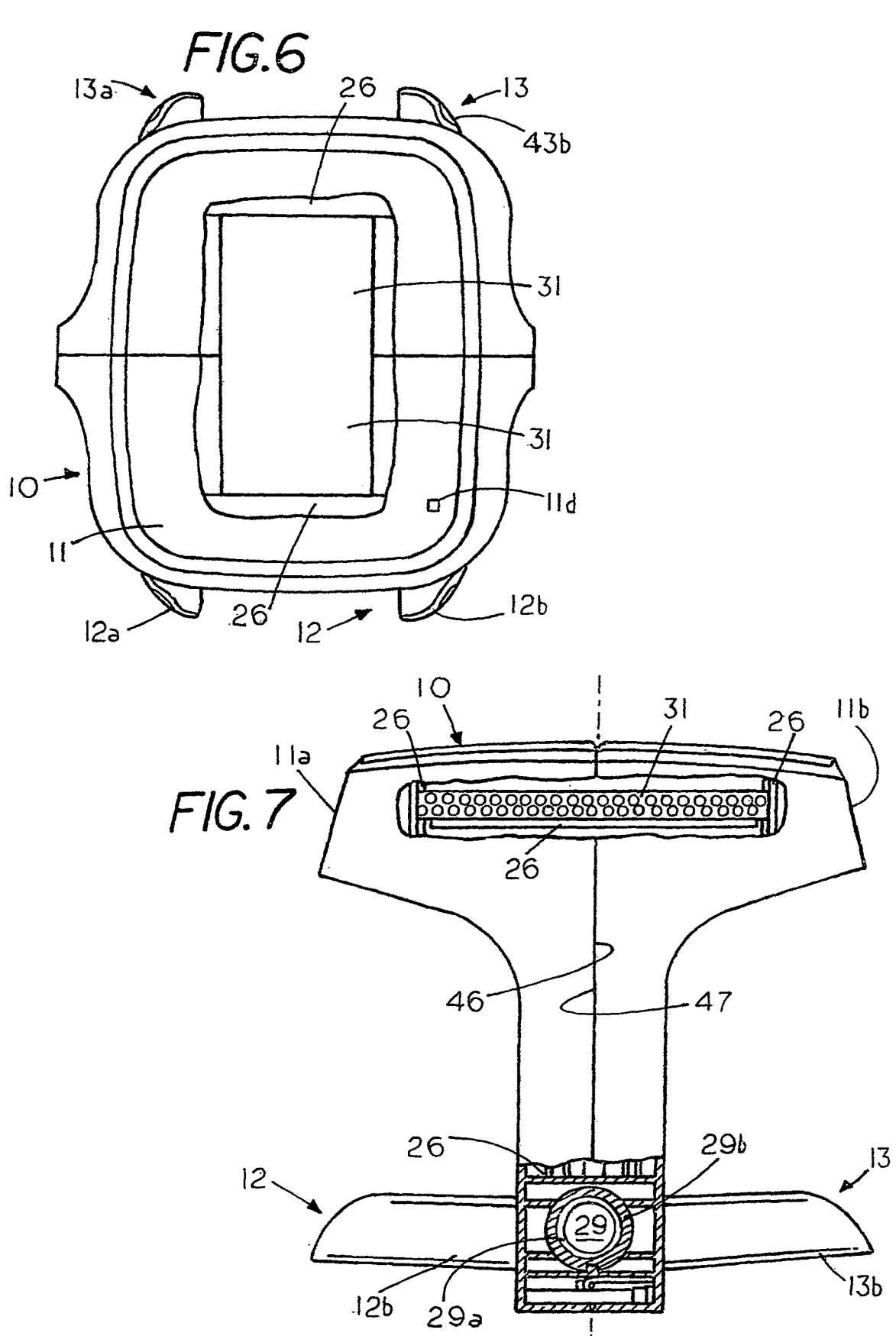

FLOATING DISPENSER HOLDER

FIELD OF INVENTION

The present invention relates to dispensing systems and, more specifically, to a floating dispenser holder for simultaneously delivering two different dispersants into a body of water from underwater dispensing ports as the floating dispenser holder floats upright in a body of water.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

Recreational bodies of water such as hot tubs, spas pools and the like require continual sanitization of the water to maintain the water safe for human immersion. Typically, a halogen such as chlorine is used to maintain the water in a safe condition for human immersion. However, high levels of a halogen, such as chlorine, can cause adverse effects, for example skin irritation. To reduce adverse effects chlorine is often accompanied by a second non chlorine sanitizer in order to maintain the water safe for human immersion. The combination of sanitizers allows one to maintain the water safe for human immersion with a lower chlorine concentration in the body of water than if only chlorine was used as the sanitizer.

Typically, one uses two floating dispensers to simultaneously dispense two different sanitizers into the body of water. In some cases, the two dispensers are secured to each other to limit the number of free-floating items in the body of water. An example of a floating dispenser system having a holder with receptacles for removeably attaching or detaching the top of two cartridge dispensers thereto is shown in applicant's U.S. Pat. No. 7,060,190. In U.S. Pat. No. 7,060,190 a cap on each of two cylindrical dispensers attaches to an underside of an elongated cartridge holder. The elongated cartridge holder and the two cylindrical dispensers float freely as a unit within the body of water as the dispersant in the two cylindrical dispensers are dispensed into the body of water to maintain the body of water in a user-friendly condition. The body of each cylindrical dispenser contains adjustable opening so that one can increase or decrease the ingress and egress of water into dispersants within the dispensing cartridges without having to remove the dispensing cartridges from the dispenser holder.

SUMMARY OF THE INVENTION

A stylized floating dispenser holder including a canopy shielding dispensing cartridges thereon from persons within a body of water with the stylized floating dispenser holder including a central top float and a set of dispenser engagement platforms extending laterally outward from the dispenser holder with each of the platforms removeably supporting and engageable with a base of a dispensing cartridge to support dispensing cartridges thereon in an upright dispensing condition as the floating dispenser holder and dispensing cartridges float about in a body of water.

BRIEF DESCRIPTION OF THE DRAWINGS

FIG. 5 is an exploded view of the floating dispenser holder of FIG. 1;

FIG. 5A is an isolated side view of a male latch and a female latch in an unlatched condition;

FIG. 5B is a top view of a male latch and a female latch of FIG. 5A in an unlatched condition;

FIG. 5C shows the male latch and the female latch of FIG. 5A in the latched condition;

FIG. 6 is a cutaway top view of the floating dispenser holder revealing a floatation member therein;

FIG. 7 shows a cutaway side view of the floating dispenser holder revealing a flotation member centrally located in a top portion of the canopy;

DESCRIPTION OF THE PREFERRED EMBODIMENT

Figure 1:
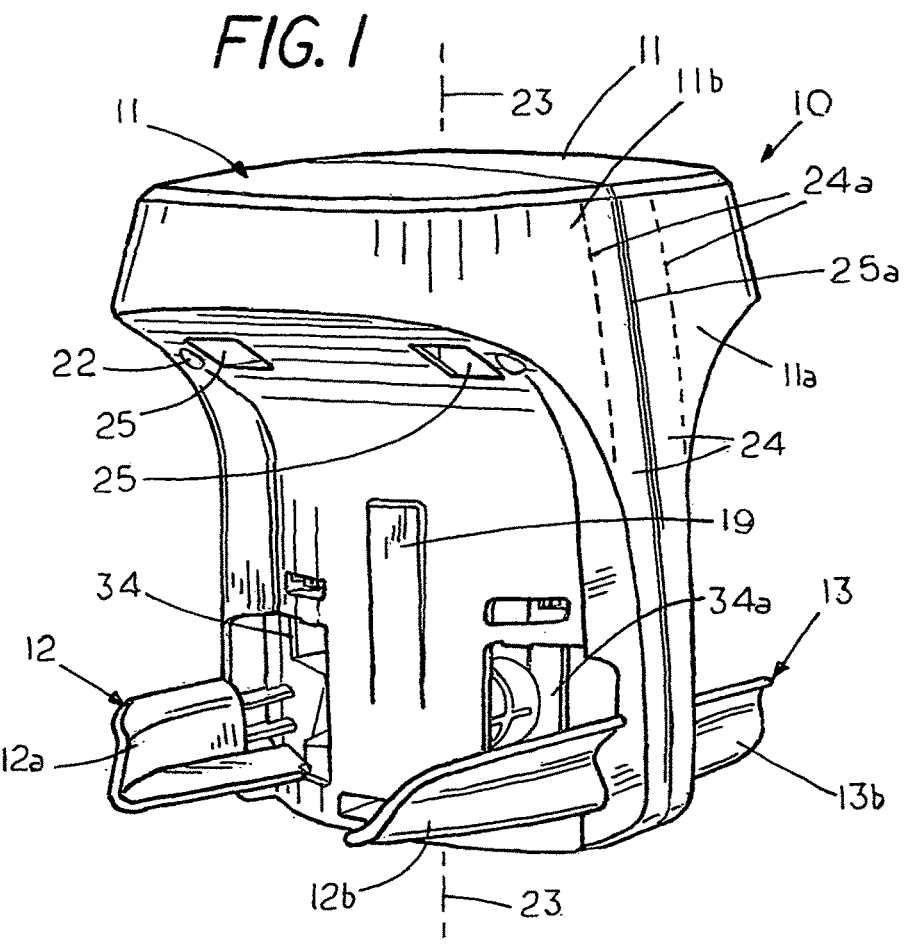
FIG. 1 is a perspective view of the floating dispenser holder without any dispensing cartridges.

FIG. 1 shows a floating dispenser holder 10 for buoyantly supporting at least two dispensing cartridges in a side-by-side condition in an immersion region of a hot tub or the like. In this example the floating dispenser holder comprises a first shell 11a and a second shell 11b with a mating edge 46 of shell 11b and a mating edge 47 of shell 11a (see FIG. 5) joined to each other along a circumferential seam 25a. A central vertical axis 23 extends vertically through a junction of the mating edge 46 and mating edge 47.

Figure 4:
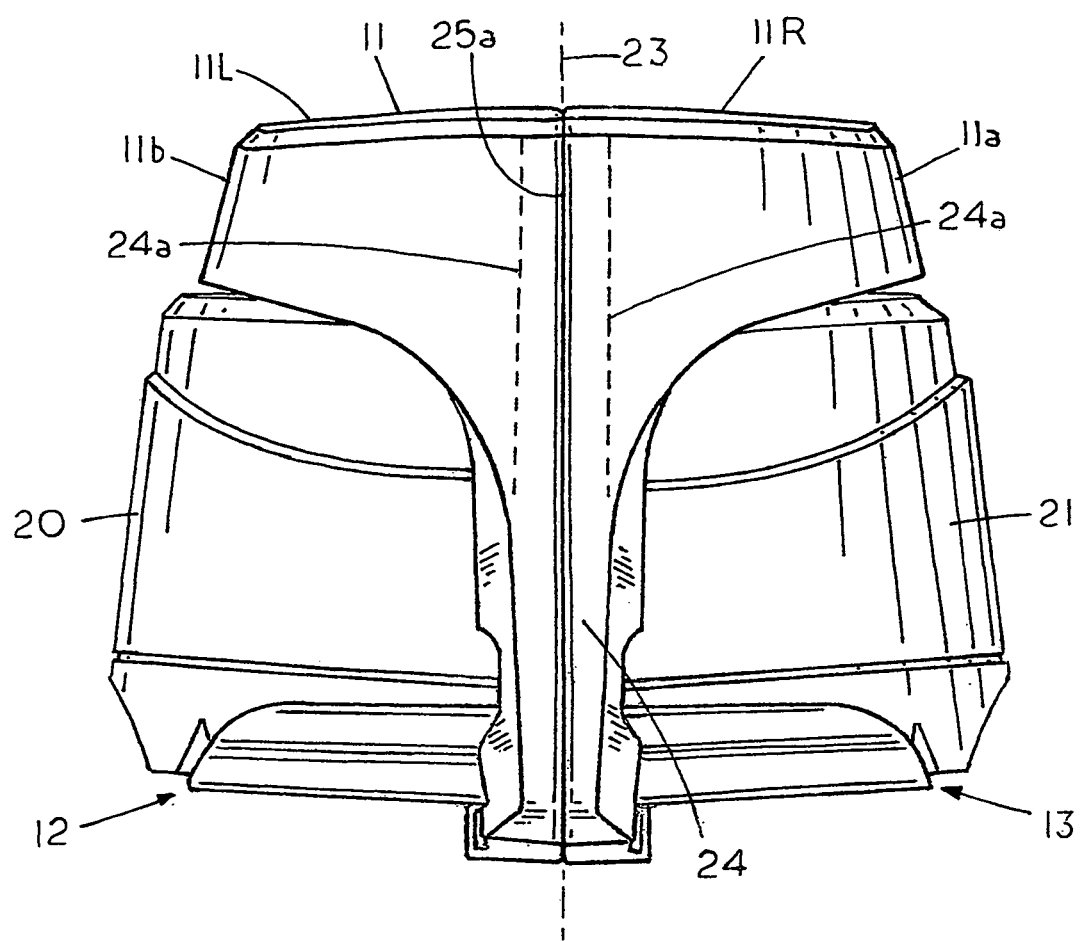
FIG. 4 is a side view of the floating dispenser holder with two dispensing cartridges mounted therein.

FIG. 1 and FIG. 4 show adjoining shell 11a and shell 11b forming an integral rigid center post 24, which is shown in the drawings as a part of shell 11a and a part of shell 11b (i.e., the portion between the dashed lines 24a). That is, the integral center post 24, which extends from top to bottom of the floating dispenser holder 10, is part of shell 11a and part of shell 11b.

A first dispensing cartridge platform 12 extends laterally outward in a first direction from integral rigid center post 24 and a second dispensing cartridge platform 13 extends laterally outward in an opposite direction from integral rigid center post 24. Similarly, FIG. 1, FIG. 4 and FIG. 7 show a top portion of floating dispenser holder 10 extending laterally outward on both sides of integral post 24 to form a stylized canopy 11 where one portion of canopy 11 is part of shell 11a and the second portion of canopy 11 is part of shell 11b.

FIG. 4 shows canopy 11 extending laterally outward over a first two-part dispensing cartridge engagement platform 12 on one side of post 24 and a second two-part dispensing cartridge engagement platform 13 on an opposite side of post 24. In this example platform 12 cradling holds a lower end of a first dispensing cartridge 20 in a dispensing condition on one side of floating dispenser holder 10 and similarly, the platform 13 cradling holds a lower end of a second dispensing cartridge 21 in a dispensing condition on an opposite side of floating dispenser holder 10 as the floating dispenser holder 10 and the dispensing cartridges thereon float about in a body of recreational water such as a pool, spa hot tub or the like.

In the example shown in FIG. 1, FIG. 4, FIG. 6 and FIG. 7 the first dispensing cartridge platform 12 includes a first resilient, acutely-angled extension 12a and a second resilient, acutely-angled extension 12b that each cantileverly extend laterally outward to clamp and support a dispensing cartridge 20 in a dispensing condition on the floating dispenser holder 10. Similarly, a second identical dispensing cartridge engagement platform 13, which includes a first resilient lateral acutely-angled extension 13b and a second resilient lateral acutely-angle extension 13a (FIG. 6) each cantileverly extend outward to clamp and support a second dispensing cartridge 21 in a dispensing condition, which is shown in FIG. 4. An example of a base support for a dispensing cartridge can be found in applicant's copending application Ser. No. 16/873,295 filed Mar. 11, 2020, which is hereby incorporated by reference.

Although the example shows identical platforms for supporting identical dispensing cartridges thereon the shape of platform 12 and platform 13 may be different from each other support to different types of dispensers thereon without departing from the spirit and scope of the invention.

The floating dispenser holder 10 contains sufficient buoyancy to support itself and a first dispensing cartridge 20 and a second dispensing cartridge 21 in either a spent or unspent condition with the water ports of the dispensing cartridges located below a waterline with at least a top portion of the canopy 11 visible above the water line. That is, when both the first dispensing cartridge 20 and the second dispensing cartridge 21 are in an unspent condition the floating dispenser holder 10 free floats in an upright condition within a body of recreational water. If desired one end of a cord (not shown) can be anchored and the other end extended through eye 22 (FIG. 1) of floating dispenser holder 10 to restrain the floating dispenser holder 10 from free floating about in a body of water.

FIG. 5 is an exploded view showing floating dispenser holder 10 comprises a two-part shell i.e a first shell 11a having an open side with a mateable peripheral edge or face 47 and a second shell 11b having an open side with a mateable peripheral edge or face 46.

Figure 8:
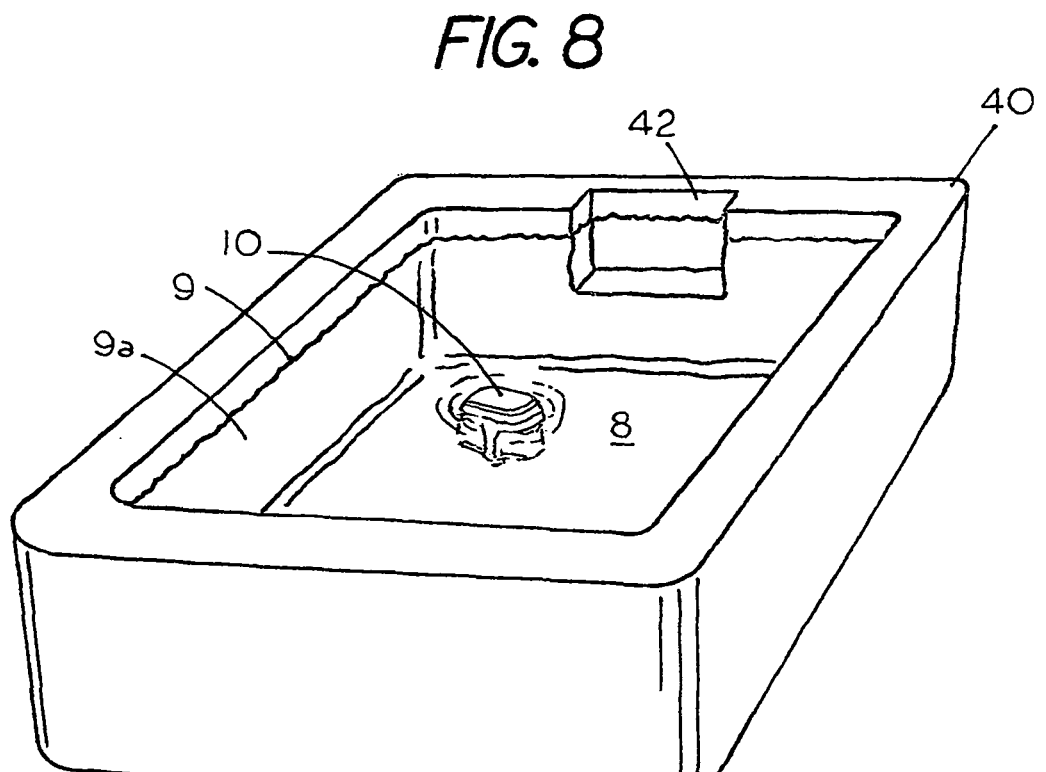
FIG. 8 shows a hot tub with a floating dispenser holder therein.
Figure 8A:
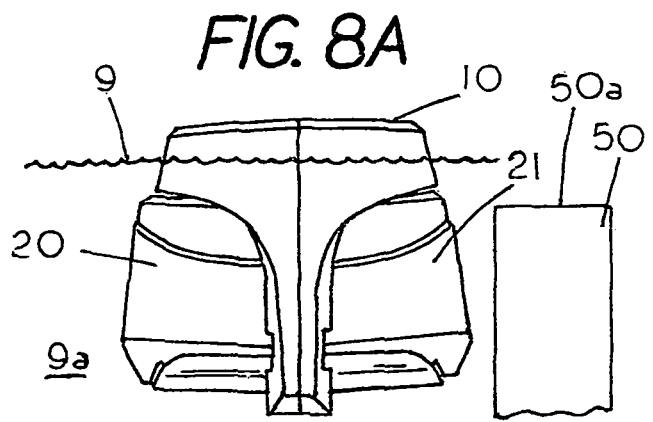
FIG. 8A shows the floating dispenser holder with respect to a water line and a hot tub skimmer port.

FIG. 5 also shows a float 31 that fits partially within a hollow of the first shell 11a and partially within a hollow of the second shell 11b so that when shell 11a and shell 11b are secured to each other along peripheral faces 46 and 47, as shown in FIG. 7, float 31 provides sufficient top floatation to support a top portion of floating dispenser holder 10 above waterline 9 while dispensing cartridges 20 and 21 are supported in a dispensing condition below the waterline 9 as shown in FIG. 8A.

A feature of shell 11a is that shell openings such as openings 25, 34 and 34a in shell 11b (see FIG. 1) as well as identical openings in shell 11a (not shown) allow water into the interior space of the floating dispenser holder 10. The water contacts float 31 as air is allowed to escape either through openings in the shells, an air hole 11d (FIG. 5) or along a circumferential seam 25a where face 46 and face 47 adjoin each other. Consequently, the top central location of float 31, as shown in FIG. 6 and FIG. 7, provides a central top buoyant force that maintains floating dispenser holder 10 in an upright dispensing condition as illustrated in FIG. 8A. That is, the weight of dispensing cartridges 20 and 21, which are supported by lower platform 12 and platform 13, exert a downward force on the bottom of floating dispenser holder 10 creating a bias for the floating dispenser holder 10 to float upright about a vertical axis 23. In this example a protrusion 19 is shown that may be used to hinder rotation of a dispensing cartridge located in the dispensing cartridge platform 12.

FIG. 5 and FIG. 6 shows shell 11a having a smoothly contoured outer face 11c and a dispensing cartridge platform 13 having a resilient, acutely-angled extension 13a and a resilient, acutely-angled extension 13b on one side integral post 24 linking the dispensing cartridge platform 13 to shell 11a. Similarly, shell 11b includes a smoothly contoured outer face 12c on one end and a dispensing cartridge platform 12 having a resilient, acutely-angled extension 12a and a resilient, acutely-angled extension 12b on one side of integral post 24 linking the dispensing cartridge platform 12 to shell 11b.

Integral post 24 is formed when shell 11a and shell 11b are abutted to each other as shown in FIG. 1. As shown in FIG. 1 and FIG. 4 integral post 24 has an upper end supporting a canopy 11 that extends laterally outward from both sides of post 24. The canopy 11 shields the top of dispensing cartridges 20 and 21 from a person or persons within the body of water. During use canopy 11 remains visible above a water line while the set of cartridge supporting platforms 12 and 13 remain below the water line thereby maintaining dispensing cartridges 20 and 21 in a dispensing condition.

Located within shell 11a are male latches 48 and female latches 49 (FIG. 5) that can be engaged with each other by abutting shell 11a and shell 11b to each other as shown in FIG. 7. To aid in alignment of shell 11a and 11b one can include alignment extensions 53 on shell 11a and alignment extensions (not shown) on shell 11b to assist in mating assembly of shell 11a and 11b.

FIG. 5A shows a side view of a male latch comprising a resilient link 48, which can flex upward, with a hook end 48b and a hook guide 48a positioned next to a rigid female latch 49 having a pocket lip 49b located in pocket 49c.

FIG. 5B shows a top view of the male latch 48 and female latch 49 in alignment prior to displacement of the latch 48 and latch 49 toward each other which causes hook guide 48a to force male latch 48 to flex upward during a forward motion of male latch 48 with respect to female latch 49. FIG. 5 C shows the male latch 48 in engagement with female latch 49 as the resiliency of male latch 48 brings the latches into latching engagement with each other. That is, lip 49b at the end of male latch 49 is in pocket 49c and in engagement with lip 49b. Typically, two or more latches may be used to secure shell lato 11b.

A feature of the male latch 48 and the female latch 49 is that the latches are self-engaging. That is as shell 11a and shell 11b are brought into face-to-face contact with each other each of the male latches flex to engage each of the female latches. Thus, a set of latches on shells 11a and 11b allow one to assemble a single smoothly contoured dispensing cartridge 10 with a stylized canopy from two mating shells that are locked or latched to each other without the aid of tools. The internal latching of the floating dispenser holder shell 11a and shell 11b prevents accidental separation of the dispenser holder 10 shells by a person or persons in a body of water since the latches 48 and 49 become inaccessible from the exterior of the floating dispenser holder 10 once the floating dispenser holder 10 is assembled.

FIG. 7 reveals a ballast compartment 29 on the lower end of holder 10 with the ballast compartment 29 comprising a cylindrical housing 29*a* mateable with a cylindrical housing 29*b* in shell 11*a* to form a closed centrally positioned ballast compartment 29 as shown in FIG. 7. Typically, a weight can be placed in ballast compartment 29 to ensure that the floating dispenser holder 10 maintains a bottom heavy condition that causes the floating dispenser holder 10 to float in an upright dispensing condition as shown in FIG. 8A as the ballast compartment is located along a vertical flotation axis 23. Thus, the floating dispenser holder 10 can be mated to dispensing cartridges to ensure that the floating dispenser holder 10 floats in the desired orientation. For example, in the event the weight of the contents of the dispensing cartridges on the floating dispenser holder differ substantially from each other.

Also Located within the floating dispenser holder 10 is an internal skeleton framework 26 (see FIG. 5 and FIG. 7) that supports a smooth outer facade of the floating dispenser holder 10 thereby providing a stylized outer appearance to the floating dispenser holder that blends with an external facade of a hot tub. A portion of the skeleton framework 26 is illustrated in cut away view of FIG. 7 that shows the ballast compartment 29 formed in the lower portion of dispenser holder 10. As described the ballast compartment 29 allows one place a weight on the bottom portion of the floating dispenser holder 10 to thereby introduce a bottom-heavy feature to the floating dispenser holder 10 as the weight of ballast therein encourages an independent upright vertical flotation of the dispenser holder as shown in FIG. 8 and FIG. 8A, which shows the floating dispenser holder 10 floating in a sitting area 40*a*, which is outside of the filterwell 42 of the hot tub 40. FIG. 8 reveals that the low, above water profile of the floating dispenser holder 10 and the portion located below the water line discourages the floating dispenser holder 10 from floating on top of the skimmer port 56, which could block the flow water into the skimmer port.

FIG. 6 and FIG. 7 show the top central placement of float 31 with float 31 held in position by float stops 26 proximate each end of float 31. Thus, in this example the float positioned in a top central location provides a flotation balance force that causes the floating dispenser holder 10 to float in an upright condition as shown in FIG. 8 and FIG. 8A. In the example shown float 31 comprises a closed cell foam 31 that is centrally confined within an upper portion of the canopy 11 with a central axis 23 of the floating dispenser holder 10 extending through a center of the float 31 that is alignment with the central vertical axis 23.

Figure 2:
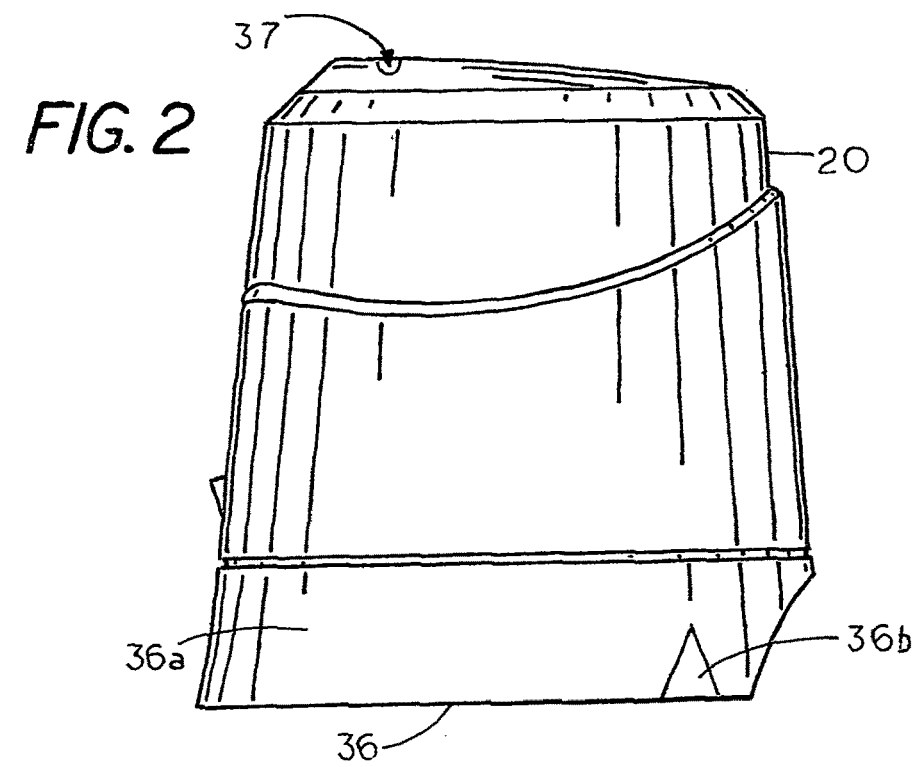
FIG. 2 is a side view of a dispensing cartridge for removeably mounting in the floating dispenser holder of FIG. 1.
Figure 3:
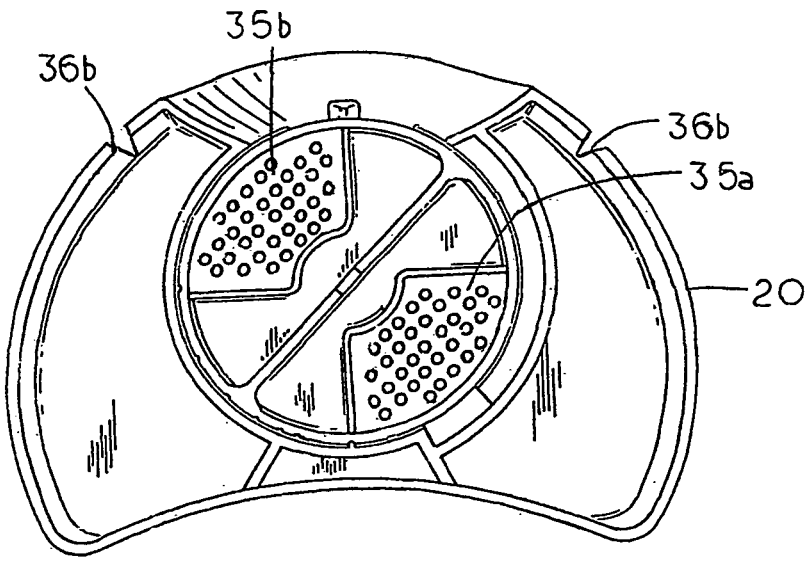
FIG. 3 is a bottom view of the dispensing cartridge of FIG. 2.

FIG. 2 is a side view and FIG. 3 is a bottom view of an example of a dispensing cartridge for removably mounting in the floating dispenser holder 10 with the cartridge 20 having an angled face, i.e., a flared base 36 with a pair of triangular shaped opening 36*b* therein to allow water access to the underside of dispensing cartridge 35 when the cartridge is located on a dispensing cartridge platform. FIG. 3 shows the underside of dispensing cartridge 35 having bottom ports 35*a* and 35*b* to permit the ingress and egress of water into a dispersant located within the dispensing cartridge 35. A top air hole 37, shown in FIG. 2 lets air escape from the cartridge 20 as water enters the dispensing compartment therein. In this example cartridge 20 has an annular angled rim 36 with a face 36*a* that forms a locking engagement with a resilient, acutely-angled extension 12*a* and a resilient, acutely-angled extension 12*b* that mates with the dispensing cartridge platforms on the floating dispenser holder 10. An example of a dispensing cartridge 35 is shown in applicant's copending application Ser. No. 16/873,295, which is hereby incorporated by reference.

FIG. 8 shows a hot tub 40 having a seating area 8, which is located outside of the filterwell 42 of the hot tub. Located within the hot tub and partly above the water line 9 of water 9*a* is floating dispenser holder 10. FIG. 8A is an isolated view of the floating dispensing holder 10 as it floats on the body of water within the hot tub while supporting dispensing cartridge 20 and dispensing cartridge 21. A feature of the floating dispenser holder 20 is that the underwater profile of the floating dispenser holder 20, which is illustrated in FIG. 8A, is such that if the floating dispenser holder 20 floatingly contacts a hot tub skimmer 56 it is unlikely to block the skimmer port 50*a* since the below water portion of the floating dispenser holder 10 acts as a bumper to prevent the floating dispensing dispenser holder from blocking skimmer port 50*a* of the skimmer 56. While the invention shown herein discloses two cartridges supported on the Floating Dispenser Holder the Floating Dispenser Holder may be used to support a single dispensing cartridge without departing from the spirit and scope of the invention.

We claim:

1. A floating dispenser holder comprising:
   a post having an upper end and a lower end;
   a first dispensing cartridge platform attached to the lower end of the post;
   a second dispensing cartridge platform attached to the lower end of the post, wherein the first dispensing cartridge platform and the second dispensing cartridge platform are located on opposite sides of the lower end of the post such that the post separates the first dispensing cartridge platform from the second dispensing cartridge platform;
   a float; and
   a canopy attached to the upper end of the post with the canopy extending over the first dispensing cartridge platform and the second dispensing cartridge platform, the float in the floating dispenser holder buoyantly supporting a first dispensing cartridge located on the first dispensing cartridge platform and a second dispensing cartridge located on the second dispensing cartridge platform below a waterline with at least a portion of the canopy located above the water line when both the first dispensing cartridge and the second dispensing cartridge are in an unspent condition.

2. The floating dispenser holder of claim 1 wherein the float is symmetrically positioned within the canopy.

3. The floating dispenser holder of claim 1 wherein a portion of the canopy and the first dispensing cartridge and the second dispensing cartridge are located below a water line when the floating dispenser holder is in a spent condition.

4. The floating dispenser holder of claim 1 wherein the first dispensing cartridge contains a batch of minerals, and the second dispensing cartridge contains a halogen.

5. The floating dispenser holder of claim 1 wherein the post comprises a first partial post integral to the canopy and a second partial post integral to the canopy with the canopy containing a closed cell foam partially within the first partial post and partially within the second partial post to provide upright buoyancy to the floating dispenser holder.

6. The floating dispenser holder of claim 1 wherein the first platform includes a first set of resilient lateral extensions that mechanically engage or disengage with a lower end of a first dispensing cartridge to support or release the first dispensing cartridge therefrom and the second platform includes a second set of resilient lateral extensions that can engage or disengage a lower end of a second dispensing cartridge.

7. The floating dispenser holder of claim 1 wherein the first dispensing cartridge platform is engageable and disengageable with an end face of the first dispensing cartridge thereon when the first dispensing cartridge is in a dispensing condition beneath the canopy.

8. The floating dispenser holder of claim 1 including a ballast located in the lower end of the post to maintain a vertical orientation of the post as the first dispensing cartridge and the second dispensing cartridge are in either a dispensing condition or a nondispensing condition.

9. A floating dispenser holder comprising:

an integral post having an upper end and a lower end;

a first dispensing cartridge platform attached to the lower end of the post;

a second dispensing cartridge platform attached to the lower end of the post, wherein the first dispensing cartridge platform and the second dispensing cartridge platform are located on opposite sides of the lower end of the of the post; and a canopy attached to the upper end of the post with the canopy extending over the first dispensing cartridge platform and the second dispensing cartridge platform, the floating dispenser holder having sufficient buoyancy to support a first dispensing cartridge located on the first dispensing cartridge platform and a second dispensing cartridge located on the second dispensing cartridge platform when both the first dispensing cartridge and the second dispensing cartridge are in an unspent condition, and wherein the post separates the first dispensing cartridge from the second dispensing cartridge.

10. The floating dispenser holder of claim 9 including a float located in the canopy, the float buoyantly supporting the first dispensing cartridge and the second dispensing cartridge in an underwater dispensing condition while the float maintains at least a portion of the canopy above a waterline in a body of water.

11. The floating dispenser holder of claim 10 wherein the float comprises a closed cell foam extending horizontally with respect to the first dispensing cartridge platform and the second dispensing cartridge platform to maintain the canopy in a horizontal condition when a first dispensing cartridge and a second dispensing cartridge are located thereon.

12. The floating dispenser holder of claim 9 wherein the first dispensing cartridge and the second dispensing cartridge each have an opening therein to allow water access to a set of ports located thereon.

13. The floating dispenser holder of claim 9 wherein the post comprises a portion of a first shell having a mating side with a latch thereon and a portion of a second shell having a mating side with a further latch thereon with the first shell and the second shell mateable to each other.

14. The floating dispenser holder of claim 13 including a float positionable partially in the first shell and partially in the second shell with the float at least partially crimpable between the first shell and the second shell when the first shell and the second shell are in a latched condition.

15. The floating dispenser holder of claim 14 wherein the float is a closed cell foam crimpable retainable within the canopy of the floating dispenser holder.

16. The floating dispenser holder of claim 1 wherein the first dispensing cartridge platform includes a first cantilevered extension extending laterally outward to support the first dispensing cartridge in a dispensing condition on the floating dispenser holder, and wherein the second dispensing cartridge platform includes a second cantilevered extension extending laterally outward to support the second dispensing cartridge in a dispensing condition on the floating dispenser holder.

17. The floating dispenser holder of claim 9 wherein the first dispensing cartridge platform includes a first cantilevered extension extending laterally outward to support the first dispensing cartridge in a dispensing condition on the floating dispenser holder, and wherein the second dispensing cartridge platform includes a second cantilevered extension extending laterally outward to support the second dispensing cartridge in a dispensing condition on the floating dispenser holder.

* * * * *